(12) United States Patent
Li et al.

(10) Patent No.: US 11,958,946 B2
(45) Date of Patent: Apr. 16, 2024

(54) METHOD FOR PREPARING CARBON NANOTUBE/POLYACRYLIC ACID HYDROGEL, PRODUCT AND APPLICATION THEREOF

(71) Applicant: Guangdong Ocean University, Zhanjiang (CN)

(72) Inventors: Lefan Li, Zhanjiang (CN); Chengpeng Li, Zhanjiang (CN); Jingyuan Guo, Guangzhou (CN); Di Wang, Zhanjiang (CN); Chengyong Li, Zhanjiang (CN); Wenhua Wang, Zhanjiang (CN); Zhang Hu, Zhanjiang (CN); Sidong Li, Zhanjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 18/331,175

(22) Filed: Jun. 8, 2023

(65) Prior Publication Data
US 2023/0312840 A1 Oct. 5, 2023

Related U.S. Application Data

(63) Continuation of application No. PCT/CN2022/074852, filed on Jan. 29, 2022.

(30) Foreign Application Priority Data

Dec. 13, 2021 (CN) .......................... 202111514809.2

(51) Int. Cl.
*C08J 3/075* (2006.01)
*C08F 2/10* (2006.01)
(Continued)

(52) U.S. Cl.
CPC ................. *C08J 3/075* (2013.01); *C08F 2/10* (2013.01); *C08F 2/44* (2013.01); *C08F 20/06* (2013.01);
(Continued)

(58) Field of Classification Search
CPC ....... C08J 3/075; C08J 2333/02; C08K 3/041; C08K 2201/011; C08F 2/10; C08F 2/44; C08F 20/06
See application file for complete search history.

(56) References Cited

U.S. PATENT DOCUMENTS

2022/0023507 A1* 1/2022 Wang .................. B29C 45/0001

FOREIGN PATENT DOCUMENTS

| CN | 103408683 | * | 8/2015 |
| CN | 107774237 | * | 3/2018 |

(Continued)

OTHER PUBLICATIONS

CNIPA, Notification of a First Office Action for CN202111514809.2, dated Apr. 13, 2022.
(Continued)

*Primary Examiner* — Robert S Jones, Jr.
*Assistant Examiner* — Jiangtian Xu
(74) *Attorney, Agent, or Firm* — Zhigang Ma

(57) ABSTRACT

A method for preparing a carbon nano tube/polyacrylic acid hydrogel, a product and an application thereof are provided. The method includes: oxidizing a carbon nanotube into a carboxylated carbon nanotube, thereafter performing in-situ polymerization with acrylic acid, sodium hydroxide, ammonium persulfate, triethanolamine and N, N-methylenebisacrylamide to obtain a carbon nanotube/polyacrylic acid hydrogel. The hydrogel has a uniform porous structure, facilitating a rapid transmission and supply of water. The carbon nanotubes in the hydrogel are of an array structure, (Continued)

achieving a full absorption of solar energy to realize a high-efficiency photothermal conversion. The gel is attached to a sponge base to obtain a solar-powered carbon nano tube/polyacrylic acid hydrogel steam generator for the photothermal conversion. The steam generator is used for solar seawater desalination, but can improve evaporation rate and evaporation efficiency. In addition, the steam generator has many advantages, such as energy conservation, environmental protection, simplicity and practicability.

3 Claims, 1 Drawing Sheet

(51) Int. Cl.
*C08F 2/44* (2006.01)
*C08F 20/06* (2006.01)
*C08K 3/04* (2006.01)

(52) U.S. Cl.
CPC ........... *C08K 3/041* (2017.05); *C08J 2333/02* (2013.01); *C08K 2201/011* (2013.01)

(56) References Cited

FOREIGN PATENT DOCUMENTS

| CN | 107774237 A | | 3/2018 | |
| CN | 110511558 A | | 11/2019 | |
| CN | 112625769 | * | 4/2021 | |
| CN | 112934129 A | | 6/2021 | |
| WO | WO-2017101129 A1 | * | 6/2017 | ............ C08F 220/06 |

OTHER PUBLICATIONS

Guangdong Ocean University (Applicant), Response to Notification of a First Office Action for CN202111514809.2, w/ replacement claims, dated May 11, 2022.

Guangdong Ocean University (Applicant), Supplemental Response to Notification of a First Office Action for CN202111514809.2, w/ (allowed) replacement claims, dated Jun. 15, 2022.

CNIPA, Notification to grant patent right for invention in CN202111514809.2, dated Jul. 5, 2022.

* cited by examiner

METHOD FOR PREPARING CARBON NANOTUBE/POLYACRYLIC ACID HYDROGEL, PRODUCT AND APPLICATION THEREOF

TECHNICAL FIELD

The disclosure relates to the field of solar seawater desalination technology, and more particularly to a method for preparing a carbon nanotube/polyacrylic acid hydrogel, a product and an application thereof.

BACKGROUND

With social and economic development and population growth, water resource supply and demand contradiction is increasingly prominent, and water resource shortage has become a global problem. Seawater desalination is of great importance for solving the problem of water resource shortage. In recent decades, the seawater desalination has achieved great progress, and a reverse osmosis technology and a multi-stage flash evaporation technology have successfully implemented in various industries. However, these technologies limit their development due to high investment, high energy consumption, and equipment contamination corrosion problems. Solar-powered seawater desalination technology is considered a promising method in terms of environmentally friendly energy supply and efficient energy conversion efficiency.

Material selection for solar interfacial evaporation desalination is a key technology in the solar-powered desalination. Designing high-performance materials that can be used for the solar interfacial evaporation desalination requires consideration of three issues. In a first aspect, photothermal materials with broad band absorption are constructed to improve solar photothermal conversion capability. In a second aspect, a locally heating in an evaporation area is performed to reduce heat loss. In a third aspect, a porous structure is constructed to provide sufficient water transport to support continuous evaporation. Various photothermal materials, such as metal nanoparticles and semiconductor materials, have been developed as photothermal agents due to their high solar photothermal conversion performance, and are used for preparing the solar-powered seawater desalination materials. Although the existing materials used for the solar interfacial evaporation seawater desalination have a certain progress in improving the evaporation rate, the evaporation efficiency and the prevention of salting-out, the evaporation rate and the evaporation efficiency of the existing materials are still low, which is difficult to meet the requirements of present solar seawater desalination. In addition, the existing materials cannot achieve an efficient heat management capability and an efficient water supply function. Therefore, how to integrate the improved heat management capability and the sufficient water supply function into a single solar evaporator to maintain high evaporation rate and evaporation efficiency to further improve the evaporation rate and the evaporation efficiency of the solar seawater desalination is still a huge challenge. It is also an urgent problem needed to be solved by those skilled in the related art.

SUMMARY

An objective of the disclosure is to provide a method for preparing a carbon nanotube/polyacrylic acid hydrogel, a product and an application thereof to further improve an evaporation rate and an evaporation efficiency of solar seawater desalination.

In order to achieve the above objective, the disclosure provides technical solutions as follows.

The first technical solution of the disclosure is to provide a method for preparing a carbon nanotube/polyacrylic acid hydrogel, including the following steps:
  step 1: adding a carboxylated carbon nanotube, acrylic acid and an alkali into water for a dispersion treatment to obtain a carbon nanotube/acrylic acid aqueous dispersion; and
  step 2: adding a crosslinking agent, an initiator and a co-initiator into the carbon nanotube/acrylic acid aqueous dispersion, and performing in-situ polymerization to obtain the carbon nanotube/polyacrylic acid hydrogel.

In an embodiment, the carboxylated carbon nanotube in the step 1 is prepared from an oxidation of a carbon nanotube through a hyper-concentrated acid solution. A carbon nanotube in the related art is difficult to disperse uniformly in the water, and the carbon nanotube is performed by a carboxylation treatment to greatly improve its water dispersibility.

In an embodiment, the hyper-concentrated acid solution is a mixed solution of concentrated sulfuric acid and concentrated nitric acid, a volume ratio of the concentrated sulfuric acid:the concentrated nitric acid is 3:1, a mass ratio of the carbon nanotube:the hyper-concentrated acid solution is 1:200-400, a temperature for the oxidation is in a range of 50 degrees Celsius (° C.) to 95° C., a time for the oxidation is in a range of 2 hours (h) to 8 h, and after the oxidation is completed, the carboxylated carbon nanotube is washed until a pH value of the carboxylated carbon nanotube is in a range of 6 to 8.

In an embodiment, the concentrated sulfuric acid is a common commercially available concentrated sulfuric acid with a mass fraction of about 98.3%, and the concentrated nitric acid is a common commercially available concentrated nitric acid with a mass fraction of about 68%.

In an embodiment, the alkali in the step 1 is sodium hydroxide, and a mass ratio of the carboxylated carbon nanotube:the acrylic acid:the sodium hydroxide:the water is 0.1-2.5:10-20:5-10: 80-120.

In an embodiment, the dispersion treatment in the step 1 is an ultrasonic dispersion treatment, and a time for the ultrasonic dispersion treatment is in a range of 10 minutes (min) to 30 min.

In an embodiment, in the step 2, the crosslinking agent is N, N-methylenebisacrylamide, the initiator is ammonium persulfate, the co-initiator is triethanolamine, a mass ration of the acrylic acid: the ammonium persulfate: the triethanolamine:the N, N-methylenebisacrylamide is 10-20:0.05-0.15:0.05-0.15:0.002-0.02, a temperature of the in-situ polymerization is in a range of 30° C. to 85° C., and a time of the in-situ polymerization is in a range of 10 min to 80 min.

The second technical solution of the disclosure is to provide a carbon nanotube/polyacrylic acid hydrogel prepared by the above method.

The third technical solution of the disclosure is to provide an application of the carbon nanotube/polyacrylic acid hydrogel in seawater desalination.

In an embodiment, the carbon nanotube/polyacrylic acid hydrogel is attached to a polyurethane sponge base to form a carbon nanotube/polyacrylic acid hydrogel steam generator. The carbon nanotube/polyacrylic acid hydrogel steam generator is placed on seawater in a floating manner, a top of the carbon nanotube/polyacrylic acid hydrogel steam generator is irradiated by sunlight, and the steam generator is powered by solar energy to evaporate, and fresh water evaporated out are collected.

The fourth technical solution of the disclosure is to provide a carbon nanotube/polyacrylic acid hydrogel steam generator, including the above carbon nanotube/polyacrylic acid hydrogel and the polyurethane sponge base.

A density of polyurethane sponge is small, and the carbon nanotube/polyacrylic acid hydrogel can completely float on the water surface by using the polyurethane sponge as the base. In addition, the polyurethane sponge has a hydrophilic property, the water delivery is good, and more water can be conveyed to a lower part of the hydrogel more quickly.

In an embodiment, a height of the polyurethane sponge base is 20 millimeters (mm), and a height of the carbon nanotube/polyacrylic acid hydrogel is 10 mm.

A thickness of a layer of the carbon nanotube/polyacrylic acid hydrogel cannot be too thin or too thick, when the layer of the carbon nanotube/polyacrylic acid hydrogel is too thin, the photothermal agent contained therein is less and the water evaporation rate is slow. Furthermore, when the layer of the carbon nanotube/polyacrylic acid hydrogel is too thick, the efficient water evaporation is unfavorable. In summary, 10 mm is a relatively suitable thickness.

Compared with the related art, the disclosure has beneficial effects as follows.

(1) The disclosure uses the carboxylated carbon nanotube as the photothermal agent, and the carboxylated carbon nanotube is ultrasonically dispersed in an acrylic acid aqueous solution polymerization system to perform the in-situ polymerization reaction under the action of the initiator and the co-initiator, thereby obtaining the carbon nanotube/polyacrylic acid hydrogel. The carboxylation treatment of the carbon nanotube can improve its water dispersibility and increase the compatibility with the polyacrylic acid hydrogel. Both of the polyacrylic acid and the carboxylated carbon nanotube have a carboxyl group to make them compatible with each other, thereby to facilitate forming a porous and array hydrogel structure. The carbon nanotube/polyacrylic acid hydrogel prepared by the disclosure has a uniform porous structure, which facilitates rapid transmission and supply of water, and the carbon nanotubes in the hydrogel are of an array structure to fully absorb solar energy, thereby generating high-efficiency photothermal conversion.

(2) The method for preparing the carbon nanotube/polyacrylic acid hydrogel provided by the disclosure is simple, and the structure of the carbon nanotube/polyacrylic acid hydrogel is easily controlled.

(3) The carbon nanotube/polyacrylic acid hydrogel is attached to the polyurethane sponge base to form a solar-powered carbon nanotube/polyacrylic acid hydrogel steam generator. The polyurethane sponge base can not only ensure the hydrogel floating on the surface of the seawater to receive the irradiation of sunlight in a maximum area, and also can transmit sufficient water to the hydrogel. In addition, the hydrogel located above the polyurethane sponge base has the uniform porous structure, which can quickly absorb the water transferred from the polyurethane sponge, while the carbon nanotubes in the hydrogel with an array structure can fully receive solar energy and produce high-efficiency photothermal conversion. The combination of both the carbon nanotube/polyacrylic acid hydrogel and the polyurethane sponge integrates the enhanced heat management and the sufficient water supply function into the single solar evaporator to fully improve the water evaporation rate and the evaporation efficiency. The disclosure uses the solar energy to power the photothermal conversion of the hydrogel, which is energy-saving, environmentally friendly, simple and practical.

BRIEF DESCRIPTION OF DRAWINGS

In order to illustrate embodiments of the disclosure or the technical solutions in the related art more clearly, a brief introduction will be made to the drawings needed in the embodiments below. Apparently, the drawings described below are only some embodiments of the disclosure. For those skilled in the art, other drawings can be obtained from these drawings without any creative effort.

DETAILED DESCRIPTION OF EMBODIMENTS

Various exemplary embodiments of the disclosure are now described in detail, which cannot be considered as a limitation to the disclosure, but are understood as a more detailed description of certain aspects, characteristics, and implementations of the disclosure.

It should be understood that terms described in the disclosure are used for describing illustrated embodiments only and are not intended to limiting to the disclosure. In addition, for numerical ranges in the disclosure, it needs to be understood that each intermediate value between an upper and a lower limitation of the corresponding range is specifically disclosed. Each smaller range between any stated values or stated range and any other stated value or intermediate value within the range is also included within the disclosure. These smaller ranges of upper and lower limits may be independently included or excluded.

Unless otherwise specified, all of technical and scientific terms used herein have the same meaning as commonly understood by those skilled in the art of the disclosure. While the disclosure describes only illustrated methods and materials, any method and material similar or equivalent to that described herein may also be used in practice or test of the disclosure. All of documents mentioned herein are incorporated by reference to disclose and describe methods and/or materials related to the documents. When conflicts with any incorporated documents, the contents herein are taken as quasi.

Various modifications and variations can be made to the illustrated embodiments of the description of the disclosure without departing from the scope or spirit of the disclosure, which would be apparent to those skilled in the art. Other embodiments obtained from the description of the disclosure will be apparent to those skilled in the art. The description and the embodiment of the disclosure are only exemplary.

As used herein, the terms "comprising", "including", "having", and "containing" are all open terminology. Namely, the above terms means including but not limiting to.

Concentrated sulfuric acid used in the following embodiments and contrast embodiments is common commercially available concentrated sulfuric acid in the market with a mass fraction of about 98.3%. Similarly, concentrated nitric acid used is common commercially available concentrated nitric acid with a mass fraction of about 68%.

Embodiment 1

Step 1, a preparation of a carboxylated carbon nanotube, includes the following steps: mixing carbon nanotubes with a mixed solution of concentrated sulfuric acid and concentrated nitric acid (with a volume ratio of the concentrated sulfuric acid:the concentrated nitric acid being 3:1) to obtain a mixture, where a mass ratio of the carbon nanotubes:the mixed solution is 1:200, performing an oxidation reaction on the mixture at 85 degrees Celsius (° C.) for 3 hours (h) to obtain a product, and washing the product until a pH value of the product is 7.

Figure 1A:
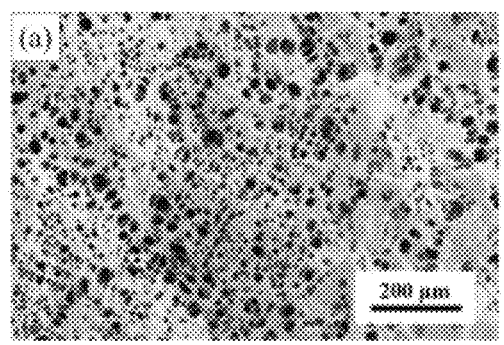
FIG. 1A illustrates a scanning electron microscope (SEM) schematic structural diagram of a carbon nanotube/polyacrylic acid hydrogel according to an embodiment 1 of the disclosure.
Figure 1B:
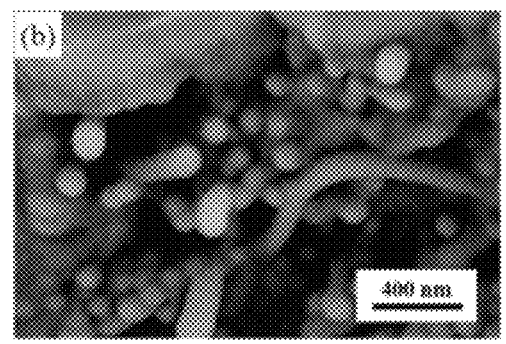
FIG. 1B illustrates a scanning electron microscope (SEM) schematic structural diagram of carbon nanotubes of the carbon nanotube/polyacrylic acid hydrogel according to the embodiment 1 of the disclosure.

Step 2, a preparation of a carbon nanotube/polyacrylic acid hydrogel, includes the following steps: weighing 0.5 g of the carboxylated carbon nanotubes, 12 g of acrylic acid, 8 g of sodium hydroxide, 0.06 g of ammonium persulfate, 0.06 g of triethanolamine, 0.01 g of N, N-methylenebisacrylamide, and 82 g of water; adding the carboxylated carbon nanotubes, the acrylic acid and the sodium hydroxide into the water, and then performing an ultrasonic dispersion treatment for 20 min (with an ultrasonic power being 1000 watts abbreviated as W) to obtain an aqueous dispersion, thereafter adding the ammonium persulfate, the triethanolamine, and the N, N-methylenebisacrylamide to the aqueous dispersion to perform in-situ polymerization at 45° C. for 55 min to obtain the carbon nanotube/polyacrylic acid hydrogel. In the embodiment, the obtained carbon nanotube/polyacrylic acid hydrogel is subjected to electron microscope scanning analysis (SEM) to obtain a SEM diagram as shown in FIG. 1A and FIG. 1B. FIG. 1A illustrates a schematic structural diagram of the hydrogel, and FIG. 1B illustrates a schematic structural diagram of the carbon nanotubes in the hydrogel. As shown in FIG. 1A, it can be seen that the hydrogel is of a uniform porous structure, which is beneficial to rapid transmission and supply of the water. Furthermore, as shown in FIG. 1B, it can be seen that the carbon nanotubes are of an array structure. Therefore, the solar energy can be fully received by the hydrogel to realize high-efficiency photothermal conversion.

Embodiment 2

Step 1, a preparation of a carboxylated carbon nanotube, includes the following steps: mixing carbon nanotubes with a mixed solution of concentrated sulfuric acid and concentrated nitric acid (with a volume ratio of the concentrated sulfuric acid:the concentrated nitric acid being 3:1) to obtain a mixture, where a mass ratio of the carbon nanotubes:the mixed solution is 1:300, performing an oxidation reaction on the mixture at 80° C. for 3.5 h to obtain a product, and washing the product until a pH value of the product is 7.

Step 2, a preparation of a carbon nanotube/polyacrylic acid hydrogel, includes the following steps: weighing 0.7 g of the carboxylated carbon nanotubes, 12 g of acrylic acid, 8 g of sodium hydroxide, 0.06 g of ammonium persulfate, 0.06 g of triethanolamine, 0.01 g of N, N-methylenebisacrylamide, and 82 g of water; adding the carboxylated carbon nanotubes, the acrylic acid and the sodium hydroxide into the water, and then performing an ultrasonic dispersion treatment for 20 min (with an ultrasonic power being 1000 watts abbreviated as W) to obtain an aqueous dispersion, thereafter adding the ammonium persulfate, the triethanolamine, and the N, N-methylenebisacrylamide to the aqueous dispersion to perform in-situ polymerization at 55° C. for 45 min to obtain the carbon nanotube/polyacrylic acid hydrogel.

Embodiment 3

Step 1, a preparation of a carboxylated carbon nanotube, includes the following steps: mixing carbon nanotubes with a mixed solution of concentrated sulfuric acid and concentrated nitric acid (with a volume ratio of the concentrated sulfuric acid:the concentrated nitric acid being 3:1) to obtain a mixture, where a mass ratio of the carbon nanotubes:the mixed solution is 1:400, performing an oxidation reaction on the mixture at 75° C. for 4 h to obtain a product, and washing the product until a pH value of the product is 7.

Step 2, a preparation of a carbon nanotube/polyacrylic acid hydrogel, includes the following steps: weighing 0.9 g of the carboxylated carbon nanotubes, 12 g of acrylic acid, 8 g of sodium hydroxide, 0.06 g of ammonium persulfate, 0.06 g of triethanolamine, 0.01 g of N, N-methylenebisacrylamide, and 82 g of water; adding the carboxylated carbon nanotubes, the acrylic acid and the sodium hydroxide into the water, and then performing an ultrasonic dispersion treatment for 20 min (with an ultrasonic power being 1000 watts abbreviated as W) to obtain an aqueous dispersion, thereafter adding the ammonium persulfate, the triethanolamine, and the N, N-methylenebisacrylamide to the aqueous dispersion to perform in-situ polymerization at 65° C. for 35 min to obtain the carbon nanotube/polyacrylic acid hydrogel.

Effect Evaluation

A preparation of a solar-powered carbon nanotube/polyacrylic acid hydrogel steam generator is as follows. The carbon nanotube/polyacrylic acid hydrogels prepared in the embodiments 1-3 are respectively attached to polyurethane sponge bases to form corresponding solar-powered carbon nanotube/polyacrylic acid hydrogel steam generators. A height of each of the polyurethane sponge bases is 20 millimeters (mm) and a length and a width of the polyurethane sponge base are both 100 mm. Each of the hydrogels is tightly attached to the corresponding polyurethane sponge base with 10 mm in height and 100 mm in length and width.

An application of the carbon nanotube/polyacrylic acid hydrogel steam generator in seawater desalination is as follows. The steam generator prepared from the carbon nanotube/polyacrylic acid hydrogel in each of the embodiments 1-3 is placed in a container filled with seawater to float on the seawater surface. The seawater is immersed in a joint between the hydrogel and the polyurethane sponge base, and then a top of the hydrogel steam generator is continuously irradiated with simulated sunlight, and along with the water evaporation, fresh water is evaporated and taken out and collected, thereby realizing the seawater desalination. The evaporation rate and the evaporation efficiency in the effect evaluation are tested, and the test methods are as follows.

Evaporation Rate

The hydrogel steam generator provided by the disclosure is placed in a beaker filled with the seawater, and then the hydrogel steam generator is floated on the seawater surface. A solar simulator with a light density of 1 kilowatt per square meter ($kW/m^2$) to simulate a sun is adopted to irradiate the sample (also referred to the hydrogel steam generator) in the beaker. The water evaporation rate in 60 min is measured under a steady-state condition, which is realized by placing the sample on an electronic analytical balance to measure a weight change of the evaporated water.

A precision of the electronic analytical balance is 0.1 milligram (mg), and then the weight of the evaporated water in per unit area of the hydrogel steam generator in a unit time is regarded as the calculated evaporation rate.

Evaporation Efficiency

A calculation formula for the evaporation efficiency is as follows:

$$Q=(sH)/(qc)\times 100\%.$$

In the calculation formula, s represents the evaporation rate (with a unit of kilogram per square meter per hour abbreviated as kg/m² h), H represents a phase change enthalpy (0.423 watt-hour per gram abbreviated as Wh/g, referred to release energy of per gram), q represents an intensity of per sun (1 kW/m²), and c represents a number of sun (with the number of 1).

Test results are shown in Table 1, which illustrates the evaporation rate and the evaporation efficiency of the embodiments as follows:

|  | Evaporation rate (kg/m²h) | Evaporation efficiency (%) |
| --- | --- | --- |
| Embodiment 1 | 2.02 | 85.4 |
| Embodiment 2 | 2.08 | 88.0 |
| Embodiment 3 | 2.15 | 90.9 |

In addition, concentrations of sodium ions, magnesium ions, potassium ions and calcium ions in the seawater before desalination treatment and concentrations of sodium ions, magnesium ions, potassium ions and calcium ions in the water collected after evaporation and desalination performed by the steam generator are detected respectively, and results are shown in Table 2.

Table 2 illustrates the concentrations (with a unit of parts per million abbreviated as ppm) of four major metal ions of the embodiments as follows:

|  | Sodium ions | Magnesium ions | Potassium ions | Calcium ions |
| --- | --- | --- | --- | --- |
| Untreated seawater | 11712 | 6534 | 438 | 362 |
| Embodiment 1 | 8.48 | 5.41 | 1.93 | 1.75 |
| Embodiment 2 | 8.56 | 5.49 | 1.88 | 1.78 |
| Embodiment 3 | 8.42 | 5.39 | 1.82 | 1.73 |

It can be seen from Table 2 that a salt removal rate of the water collected after the evaporation and the desalination by the steam generator reaches 99.9%.

The above-described embodiments are only a description of the illustrated method of the disclosure, not a limitation of the scope of the disclosure. Without departing from the spirit of the design of the disclosure, various modifications and changes made by those skilled in the art to the technical solution of the disclosure shall fall within the scope of protection determined by the claims of the disclosure.

What is claimed is:

1. A method for preparing a carbon nanotube/polyacrylic acid hydrogel, comprising following steps:
   step 1: adding a carboxylated carbon nanotube, acrylic acid and an alkali into water to obtain mixed materials and performing a dispersion treatment on the mixed materials to obtain a carbon nanotube/acrylic acid aqueous dispersion;
   step 2: adding a crosslinking agent, an initiator and a co-initiator into the carbon nanotube/acrylic acid aqueous dispersion, and performing in-situ polymerization to obtain the carbon nanotube/polyacrylic acid hydrogel;
   wherein in the step 1, the alkali is sodium hydroxide, and a mass ratio of the carboxylated carbon nanotube:the acrylic acid:the sodium hydroxide:the water is 0.1-2.5: 10-20:5-10:80-120; and
   wherein in the step 2, the crosslinking agent is N, N-methylenebisacrylamide, the initiator is ammonium persulfate, the co-initiator is triethanolamine, a mass ratio of the acrylic acid:the ammonium persulfate:the triethanolamine:the N, N-methylenebisacrylamide is 10-20: 0.05-0.15:0.05-0.15:0.002-0.02, a temperature of the in-situ polymerization is in a range of 30 degrees Celsius (° C.) to 85° C., and a time of the in-situ polymerization is in a range of 10 minutes (min) to 80 min; and
   wherein before the step 1, the method further comprises:
   mixing concentrated sulfuric acid and concentrated nitric acid to obtain a hyper-concentrated acid solution;
   mixing a carbon nanotube with the hyper-concentrated acid solution to obtain a mixture; and
   performing an oxidation on the mixture to obtain a product, and washing the product, thereby preparing the carboxylated carbon nanotube;
      wherein a volume ratio of the concentrated sulfuric acid:the concentrated nitric acid is 3:1, a mass ratio of the carbon nanotube:the hyper-concentrated acid solution is 1:200-400, a temperature for the oxidation is in a range of 50° C. to 95° C., a time for the oxidation is in a range of 2 hours (h) to 8 h, and after the oxidation is completed, the carboxylated carbon nanotube is washed until a pH value of the carboxylated carbon nanotube is in a range of 6 to 8.

2. The method for preparing the carbon nanotube/polyacrylic acid hydrogel according to claim 1, wherein the dispersion treatment in the step 1 is an ultrasonic dispersion treatment, and a time for the ultrasonic dispersion treatment is in a range of 10 min to 30 min.

3. A method for preparing a carbon nanotube/polyacrylic acid hydrogel, comprising following steps:
   providing a carbon nanotube, concentrated sulfuric acid, concentrated nitric acid, acrylic acid, sodium hydroxide, a crosslinking agent, an initiator, a co-initiator, and water;
   mixing, according to a volume ratio of the concentrated sulfuric acid:the concentrated nitric acid being 3:1, the concentrated sulfuric acid and the concentrated nitric acid to obtain a hyper-concentrated acid solution;
   mixing, according to a mass ratio of the carbon nanotube: the hyper-concentrated acid solution being 1:200-400, the carbon nanotube with the hyper-concentrated acid solution to obtain a mixture;
   performing an oxidation reaction on the mixture at 50-95° C. for 2-8 h to obtain a product;
   washing the product until a pH value of the product is in a range of 6 to 8, thereby preparing a carboxylated carbon nanotube;
   adding the carboxylated carbon nanotube, the acrylic acid, and the sodium hydroxide into the water according to a mass ratio of the carboxylated carbon nanotube:the acrylic acid:the sodium hydroxide:the water being 0.1-2.5:10-20:5-10:80-120 to obtain mixed materials, thereafter performing an ultrasonic dispersion treatment on the mixed materials for 10-30 min to obtain an aqueous dispersion; and adding the crosslinking agent, the initiator, and the co-initiator into the aqueous dispersion to perform in-situ polymerization on the aqueous dispersion at 30-85° C. for 10-80 min to obtain a carbon nanotube/polyacrylic acid hydrogel with a uniform porous structure, and the carbon nanotube in the carbon nanotube/polyacrylic acid hydrogel being composed of an array structure.

* * * * *